Nov. 24, 1942.                J. LA FORCE                2,302,781
                        AUTOMATIC WELDING APPARATUS
                          Filed Nov. 13, 1940
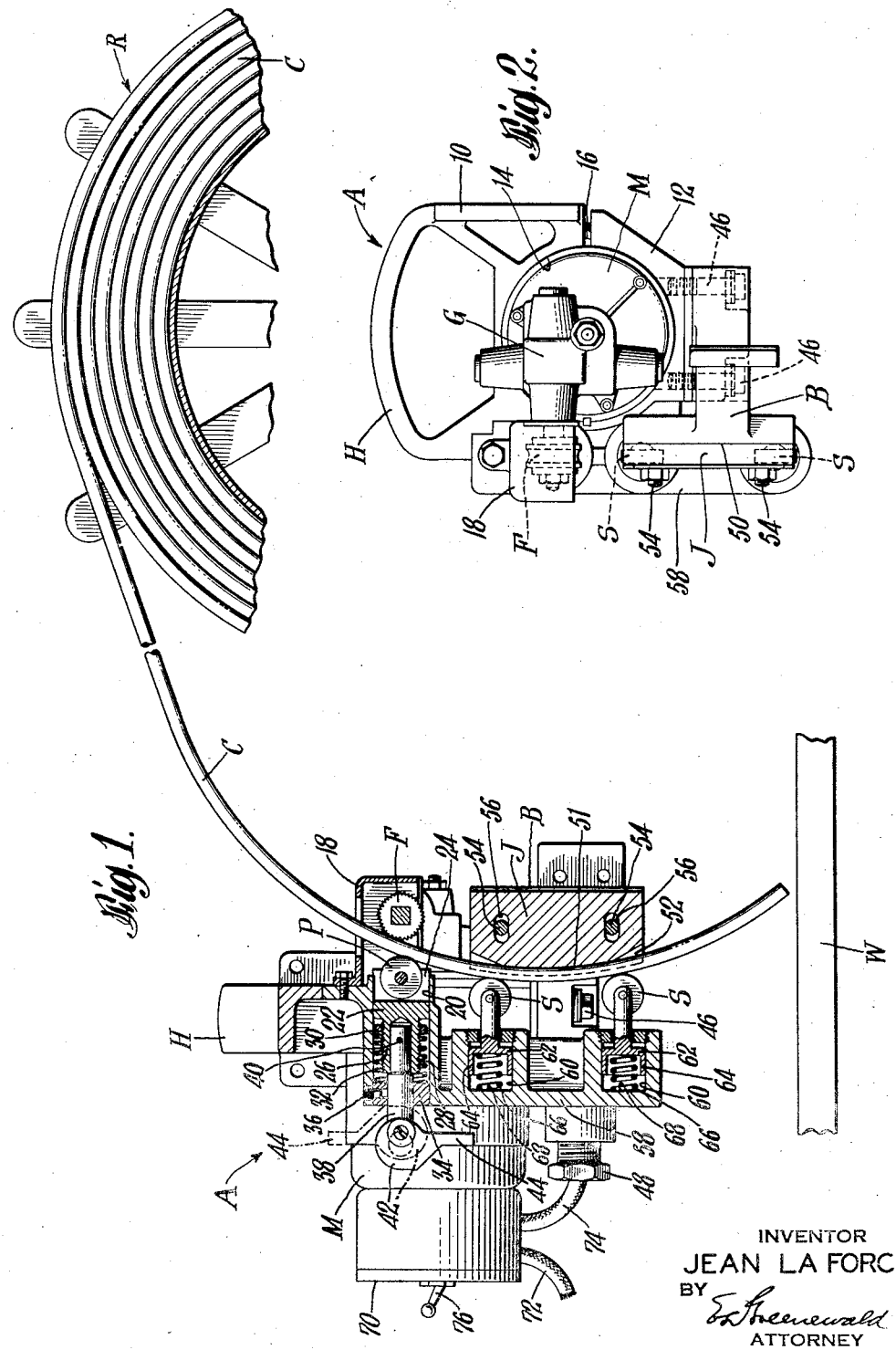
INVENTOR
JEAN LA FORCE
BY
ATTORNEY

UNITED STATES PATENT OFFICE 2,302,781

AUTOMATIC WELDING APPARATUS

Jean La Force, San Francisco, Calif., assignor to The Linde Air Products Company, a corporation of Ohio Application November 13, 1940, Serial No. 365,407

11 Claims. (Cl. 219—8)

This invention relates to automatic welding apparatus, and more particularly to means for feeding a coiled welding wire or rod to the work to be welded while insuring more stable conditions in the welding zone.

In welding with automatic electric welding apparatus, means must be provided to straighten coiled welding rod or wire as it is pulled from a reel so that the welding rod will be maintained in proper electrical contact with the current carrying means, such as the jaws or nozzles which conduct welding current to the welding rod. Provision must also be made to keep the welding rod from turning around, as otherwise the curvature of the rod, due to its coiling, will cause the end of the rod to diverge from the line of welding.

In known automatic electric welding apparatus, the rate of feeding the welding rod to the welding puddle or work generally is controlled by varying the speed of the rod feeding means, the speed thereof usually being determined by the voltage drop between the welding rod and the work. When the welding rod is fed perpendicularly to the work, any momentary change in the speed of the feeding means will at least momentarily affect the voltage drop between the rod and the work, and may adversely affect the welding conditions and quality of the weld. Suitable means for stabilizing the conditions in the welding puddle so that momentary changes in the speed of the feeding means will not adversely affect the welding conditions or quality of the weld, have not heretofore been provided.

It is therefore among the objects of this invention to provide improved and simplified automatic welding apparatus, with which the conditions in the welding zone are not affected by momentary changes in the speed of the welding rod feeding means; to provide simplified mechanism for further bending coiled welding wire or rod and feeding it to the work to be welded at an angle; to provide improved means for conducting electric current to a welding rod; and to provide an improved current carrying contact jaw and means for urging a welding rod into contact therewith.

These and other objects of the invention will in part be obvious and in part become apparent from the following description and accompanying drawing, in which:

Fig. 1 is a side elevational view of welding apparatus embodying the principles of the invention; and Fig. 2 is an end elevational view of a portion of the apparatus illustrated in Fig. 1.

Generally speaking, the objects of the invention may be attained by eliminating the straightening rolls, usually included in automatic welding apparatus, and by using a contact jaw having a rod engaging surface curved on a radius slightly smaller than the radius of the coiled welding rod as it is drawn from the reel. The rod engaging surface preferably is grooved, and two or more idling pressure rollers may be provided to hold the welding rod in position in the groove and keep it from turning in a horizontal plane. The proper welding position of the rod is thus maintained and in electric welding apparatus proper electrical contact is made with the welding rod. To stabilize conditions in the welding zone and to render the welding rod feeding mechanism less sensitive to momentary changes in the speed of the feeding mechanism, the curved contact jaw is so mounted that the welding rod is fed to the welding puddle or the work at an angle other than a right angle. With this arrangement, any momentary change in the speed of the rod feeding means will not appreciably change the distance between the end of the rod and the work. Hence, in electric welding, the voltage drop between the welding rod and the work is not changed to such a great extent as when the welding rod is fed perpendicularly to the work. Therefore, the welding apparatus is not sensitive to changes in conditions in the welding zone momentarily affecting the speed of the feeding means and the conditions in the welding zone are substantially stabilized.

The principles of the invention are applicable to any automatic welding apparatus in which a welding rod or wire is automatically fed to the welding zone. Thus, the invention is applicable equally to automatic electric welding heads and to rod or wire feeding mechanisms used in gas welding. However, to illustrate a specific embodiment of the invention, the principles of the invention will be described as applied to an electric welding apparatus.

Referring more particularly to the drawing, the invention is illustrated as applied to an automatic electric welding apparatus A operatively associated with a reel R containing coiled welding rod C. The reel R may be of any suitable construction, and preferably should permit easy withdrawal of the welding rod therefrom and be adapted for quick and easy reloading with a new coil of rod when empty. A preferred form of rod reel may be that described and claimed in Patent No. 2,188,070, issued on January 23, 1940, in the names of Albert W. Baird and Frederick G. Outcalt.

The apparatus A may comprise a handle or bracket H in which is mounted rod feeding means such as a motor M driving a feeding roller F through the medium of a gear reducer G. The welding rod C withdrawn from reel R is maintained in engagement with the feeding roller F by an adjustable pressure roller P, and after passing between the rollers F and P is drawn through a groove in a longitudinally curved edge of a contact jaw J and is maintained in full contact with the groove by one or more straightening pressure rollers S. Thereby, a predetermined degree of curvature is imparted to the rod. As the rod is fed along the jaw J toward the work W, electric current is conducted thereto through the medium of a bus bar B secured to the bracket or handle H and electrically connected to jaw J.

More particularly, the bracket or handle H comprises upper and lower sections 10 and 12, respectively, formed to provide an annular opening 14 to receive the casing of the motor M, and secured together by suitable means such as bolts 16. The motor M is mounted in the bracket or handle H in such a manner that it projects on either side thereof, and on the forward end of the motor is secured the gear reducer G which transmits the torque of the motor to the feeding roller F, which may be mounted in a bracket 18 on the upper section 10 of the handle H. In radial alignment with the feeding roller F, is the pressure roller P, and for this purpose a socket 20 is formed on the handle H in which is slidably mounted a guide block 22 having a bifurcated forward end 24 rotatably supporting the pressure roller P. The guide block 22 is formed with a tubular or cylindrical rear extension 26 having threads 28 engaged by a nut 30. Resilient means such as a spring 32 surrounds extension 26, and is seated at one end against the nut 30 and at the other end is engaged by a washer 34 held in place at the outer end of the socket by suitable means such as screws 36. A rod 38 passes through the washer 34 and is held in the extension 26 by a pin 40. On the outer end of the rod 38, is an eccentric 42 having an operating handle 44. It will be observed, by reference to the drawing, that movement of the eccentric 42 from the position shown in full lines to that shown in dotted lines will compress the spring 32 removing the pressure from the roller P and permitting the welding rod to be threaded between the rollers F and P. The described means are effective to withdraw pressure roller P from engagement with feeding roller F, against the force of spring 32, and retain roller P in the withdrawn position.

The means for conducting electric current to the contact jaw includes the bus bar B which is secured to the lower section 12 of the handle H by suitable means, such as bolts 46. On the rear end of the bus bar are terminals 48 to which may be secured the welding current cable or cables. The forward end of the bus bar is formed with a vertically extending surface 50 adjustably supporting the contact jaw J, which jaw forms one of the principal features of this invention.

Contact jaw J may comprise a substantially flat plate, one edge surface 51 of which is curved longitudinally about a radius smaller than the radius of the coiled welding rod C on the reel R and grooved as at 52. The jaw J is mounted on the surface 50 of the bus bar B by means of bolts 54 which engage in spaced curved slots 56 in the jaw. As each slot 56 is curved on a radius about one of the bolts 54 in the opposite slot as a center, it will be apparent that this arrangement permits adjustment of the contact jaw J about such centers so that the welding rod can be fed to the work W at any desired angle.

The welding rod C is maintained in engagement with the groove 52 of the contact jaw by suitable pressure means, such as the straightening pressure rollers S, which are spaced longitudinally of surface 51. For this purpose a bracket 58 provided with sockets 60 is secured to the handle H, and a guide block 62 formed with an annular seat 64 is mounted in each socket 60. A spring 66 is compressed between the annular seat 64 and the bottom 68 of each socket 60, and these springs urge the rollers S into engagement with the welding rod C to force the same into adequate current carrying contact with the groove 52 throughout the length of the groove.

The operation of the invention will be readily understood upon inspection. The welding rod C, which is coiled upon the reel R, is withdrawn therefrom and threaded between the rollers F and P and between the jaws J and the rollers S. The curved contact jaws J, in cooperation with rollers S, impart a sharper degree of curvature to the welding rod, while at the same time maintaining it in its original plane and preventing it from "flopping around." By suitable adjustment of the bolts 54, the jaw J may be adjusted to feed the welding rod C to the work W at any desired angle. When the welding rod has been properly secured in the apparatus A, the motor M is energized to rotate the feed roller F, thus advancing the welding rod C toward the work.

Convenient control for the operation of the rod feeding motor M and for the welding current may be provided on the rear end of the motor M. These controls may be included in a terminal box 70, through which the current carrying cables 72 for the motor and for the welding current supply are brought. From this box a cable 74 extends to the terminals 48. Suitable switches 76 may be mounted on the terminal box 70 to control the operation of the motor and the flow of welding current to the welding rod.

The described device feeds the welding rod to the work at an angle other than a right angle, whereby momentary fluctuations in the speed of the motor M are not immediately reflected in changes in the voltage drop between the end of the welding rod and the work. This stabilizes the conditions at the welding zone. Furthermore, the described device provides a simple and effective means for bending the welding rod and conducting current thereto. This is in sharp contrast to the apparatus used heretofore in which complicated sets of straightening and feeding rollers have been found necessary to properly position the electrode or welding rod with relation to the work. The angle at which the welding rod is fed to the work may be readily adjusted by loosening the bolts 54 and adjusting the jaw J to the proper position on the surface 50 of the bus bar B.

Although the invention has been described with reference to its application to electric welding, it will be understood that the principles of the invention are applicable equally to any other type of wire or rod feeding apparatus, such as automatic rod feeding devices used in gas welding operations. Furthermore, while a specific embodiment of the invention has been described in order to illustrate how the principles of the invention may be applied, it should be understood that this is exemplary only and that the invention may be otherwise embodied and the dimensions and interrelation of parts changed within the scope of the appended claims.

What is claimed is:

1. Electric welding apparatus comprising, in combination, a bracket; a bus bar secured to said bracket; a pair of bolts secured to said bus bar; and a contact jaw plate mounted on said bus bar, said plate being formed with spaced curved slots each operatively receiving one of said bolts, each of said slots being curved on a radius about a center on one of said bolts; and an edge of said plate being curved longitudinally whereby to impart a predetermined degree of curvature to a welding rod held in conforming engagement with said edge.

2. Electric welding apparatus comprising, in combination, means for feeding a welding rod toward the work to be welded; a bus bar secured to said feeding means; a contact jaw adjustably mounted on said bus bar and having an edge engaging said welding rod and curved longitudinally thereof; and means for maintaining said welding rod in engagement with said curved edge of said contact jaw to impart predetermined degree of curvature to said welding rod.

3. Automatic welding apparatus comprising, in combination, a handle formed to provide an annular opening and a socket; a motor mounted in said annular opening in said handle; a bracket secured to said handle; a feeding roller mounted in said bracket and driven by said motor; a guide block slidably mounted in said socket; a pressure roller mounted in said guide block and operatively associated with said feeding roller; a contact jaw plate adjustably mounted on said handle and adapted to engage a welding rod advanced by said feeding roller toward the work to be welded; and pressure rollers mounted on said handle and operative to urge such welding rod into engagement with said contact jaw plate.

4. Automatic welding apparatus as claimed in claim 3, including resilient means engaging said guide block and said socket and urging said pressure roller into engagement with said feeding roller; and means for withdrawing said pressure roller from engagement with said feeding roller, against the force of said spring, and retaining said pressure roller in the withdrawn position.

5. Means for withdrawing coiled welding rod from a reel and feeding such rod toward the work to be welded comprising, in combination, a driven feeding roller; a pressure roller operative to urge said welding rod into engagement with said feeding roller; and current conducting means comprising a flat plate having a longitudinal edge surface engaging said rod as it is fed by said feeding roller toward the work to be welded, said surface being curved lengthwise of said rod, about a radius smaller than the radius of such coiled welding rod, to impart a predetermined degree of curvature to said rod.

6. Means for withdrawing coiled welding rod from a reel and feeding such rod toward the work to be welded comprising, in combination, a driven feeding roller; a pressure roller operative to urge said welding rod into engagement with said feeding roller; and current conducting means comprising a flat plate having a longitudinal edge surface engaging said rod as it is fed by said feeding roller toward the work to be welded, said surface being curved lengthwise of said rod to impart a predetermined degree of curvature to said rod; said current conducting means being adjustable to direct said rod toward the work at a predetermined angle other than a right angle, whereby momentary changes in the speed of said driven feeding roller will not appreciably change the distance between the end of said rod and the work to be welded.

7. Means for withdrawing coiled welding rod from a reel and feeding such rod toward the work to be welded comprising, in combination, a driven feeding roller; a pressure roller operative to urge said welding rod into engagement with said feeding roller; current conducting means comprising a flat plate having a longitudinal edge surface engaging said rod as it is fed by said feeding roller toward the work to be welded, said surface being curved lengthwise of said rod to impart a predetermined degree of curvature to said rod; and a pair of pressure rollers adapted to urge said rod into engagement with said surface, said rollers being spaced longitudinally of said surface whereby said rollers will cooperate with said surface to impart a predetermined degree of curvature to said rod.

8. For use with automatic welding apparatus, a substantially flat contact jaw plate having a longitudinally curved welding rod engaging edge surface, whereby said plate is adapted to impart a predetermined degree of curvature to such welding rod; said plate being formed with spaced curved slots, each of said slots being curved on a radius about a center in the other slot, whereby when said plate is mounted on such welding apparatus it may be adjusted about such centers to direct a welding rod toward the work at any desired angle.

9. For use with automatic welding apparatus, a substantially flat contact jaw plate having a longitudinally curved welding rod engaging edge surface, whereby said plate is adapted to impart a predetermined degree of curvature to such welding rod; said plate being formed with spaced curved slots, each of said slots being curved on a radius about a center in the other slot, whereby when said plate is mounted on such welding apparatus it may be adjusted about such centers to direct a welding rod toward the work at any desired angle; and pressure rollers spaced longitudinally of said edge surface and operative to maintain a welding rod in conforming engagement therewith to impart such predetermined degree of curvature to such welding rod.

10. In an automatic welding apparatus adapted to feed a coiled welding wire or rod from a reel to a welding zone, means having a curved groove having extensive engagement with said welding wire or rod, the curvature of said groove having a radius smaller than that of said coiled wire or rod as it is drawn from said reel, whereby said groove is adapted to impart to said rod a curvature having a radius substantially that of said groove and smaller than that of the wire or rod as it is drawn from said reel.

11. In automatic welding apparatus as claimed in claim 10, pressure roller means spaced longitudinally of said groove for holding said wire or rod in position in said groove as it moves therethrough.

JEAN LA FORCE.